United States Patent [19]
Allen et al.

[11] Patent Number: 4,800,043
[45] Date of Patent: Jan. 24, 1989

[54] COLORANTS FOR BALL POINT PEN AND RIBBON INKS DERIVED FROM PARAROSANILINE PROCESS RESIDUE

[75] Inventors: Robert J. Allen; Louis Rolando de Alvare; Floyd G. Spence, all of Holland, Mich.

[73] Assignee: BASF Corporation, Parsippany, N.J.

[21] Appl. No.: 18,299

[22] Filed: Feb. 24, 1987

[51] Int. Cl.[4] ............... C09B 11/10; C09B 29/01; C09D 11/02; C09D 11/18

[52] U.S. Cl. ..................... 260/391; 106/20; 106/22; 106/23; 534/573

[58] Field of Search ............ 260/391; 534/573

[56] References Cited

U.S. PATENT DOCUMENTS

| | | | |
|---|---|---|---|
| 3,589,897 | 6/1971 | Fox et al. | 260/391 X |
| 3,686,233 | 8/1972 | Gordon et al. | 260/391 |
| 3,884,869 | 5/1975 | Conger | 260/391 X |

*Primary Examiner*—Floyd D. Higel
*Attorney, Agent, or Firm*—William G. Conger

[57] ABSTRACT

Reddish-brown to yellow shade colorants suitable for ribbon and ball point inks are produced from the glassy waste by-product of pararosaniline manufacture.

10 Claims, No Drawings

COLORANTS FOR BALL POINT PEN AND RIBBON INKS DERIVED FROM PARAROSANILINE PROCESS RESIDUE

BACKGROUND OF THE INVENTION

1. Field of the Invention

The subject invention relates to a process for manufacturing colorants. More particularly, it relates to a process for manufacturing non-volatile colorants and the resulting products which are suitable for use in ribbon, ball point pen, and other inks. These colorants are manufactured from waste by-products of pararosaniline preparation.

2. Description of the Related Art

Although many of the triarylmethane dyestuffs have declined in importance in recent years, pararosaniline and its analogues have remained significant products, especially as intermediates in preparing dyes such as spirit blue, and sulfonated derivatives, for example soluble sky blue, and particularly alkali blue.

The precursors to these products have been produced by a variety of methods, for example by the condensation of substituted or unsubstituted methylenedianilines (MDA) with aniline or substituted anilines such as the toluidines. These precursors thus have the general formula:

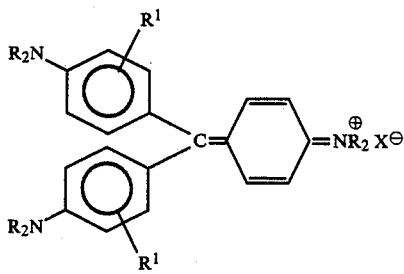

wherein $R^1$ may be, by way of example, hydrogen, $C_1$-$C_8$ alykyl or alkenyl, halo, cyano, or alkoxy; $X^-$ is an anion, for example an ion such as chloride, sulfate, or nitrate; and R is hydrogen, lower alkyl, lower alkenyl, phenyl, substituted phenyl, naphthyl, or substituted naphthyl.

The simplest member of this series is pararosaniline (paramagenta, parafuchsine, CI 42500) where R and $R^1$ are both hydrogen. Thus the structural formula is:

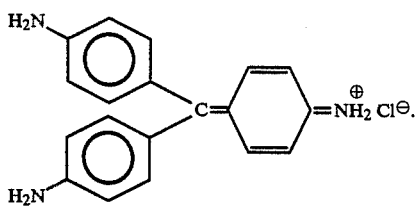

Of course, as is well known, the structural form given above represents only one cannonical version of the actual structure which is a resonance hybrid. Pararosaniline has been prepared by heating 4.4'-MDA with aniline, aniline hydrochloride, nitrobenzene, and ferric chloride; by heating aniline and p-toluidine and their hydrochlorides with iron of ferric chloride and nitrobenzene; by oxidizing a mixture of aniline and p-toluidine with arsenic acid; and by heating aniline with carbon tetrachloride and aluminum chloride. Modernly, however, the preferred method of manufacture is the air oxidation of 4,4'-MDA and aniline in excess aniline, using vanadium oxide or other suitable catalyst. Replacement of 4,4'-MDA in whole, or in part, with substituted MDAs such as 3,3'-dimethyl-4,4'-MDA or 2,2'-dimethyl-4,4'-MDA, or the replacement of aniline by substituted anilines such as the toluidines results in similar products having somewhat different color, shade, and tinctorial strength.

Following the condensation, the dyestuff is isolated in salt form, preferably as the nitrate. Excess aniline is generally removed from the filtrate by stripping in vacuo. During the removal of aniline from the filtrate, a non-volatile residue collects as bottoms in the distillation vessel. When allowed to cool, the bottoms form a hard, glassy deposit of interdeterminate composition. At regular intervals, these bottoms must be removed, preferably while still liquid, and discarded or burned. As with many other by-products of dye and pigment manufacture, disposal of such waste is expensive and problematic.

SUMMARY OF THE INVENTION

It has now been surprisingly discovered that the waste by-products of the aniline-rich filtrate distillation may be used as intermediates to form economical dyestuffs. These dyestuffs are especially useful in the manufacture of ball point pen, ribbon, and other inks, through direct formation of resinates or by initial coupling followed by resinate formation. In addition to being economically attractive, the new colorants of the subject invention are non-volatile and hence superior to many commercial products in this respect, i.e. Bismark Brown.

DESCRIPTION OF THE PREFERRED EMBODIMENTS

The distillation bottoms useful for the practice of the subject invention are produced in the manufacture of triphenylmethane and related dyes of the pararosaniline family, typified by the formula on page 1 of the application, during the removal of excess aniline, toluidine, or other relatively low-boiling aromatic amine from the dyestuff isolation filtrate by vacuum distillation. Similar deposits do not occur if other, more harsh means of purification, i.e. steam distillation, are utilized. Preferably, the bottoms are those produced during aniline removal from pararosaniline isolation filtrates. Pararosaniline is an important intermediate in the preparation of spirit blues and alkali blues.

According to the preferred process of the subject invention, the bottoms are periodically removed from the distillation vessel, allowed to solidify to hard, glassy solids, and ground to a fine powder. The fine powder may then be dissolved in acid, diazotized and coupled to produce colorants of high color value. Alternatively, the fine powder may be dissolved as is in a resinic acid, preferably a fatty acid such as oleic acid, to form a resinate. In the sense used by the inventors, the term resinic acid refers to long chain saturated or unsaturated carboxylic acids. These acids may be derived from a variety of sources, i.e. from rosin, from the processing of cellulose products (tall oil acids), or from the hydrolysis of animal or vegetable triglycerides. Examples of saturated "resinic" acids are lauric, palmitic, and stearic acids. Examples of unsaturated resinic acids are linoleic, linolenic, oleic, palmitoleic, abietic, and pimaric acids. The resinate, which is generally a brownish-orange, may then be used as a colorant in ball point pen, ribbon, and other inks.

A further alternative is to dissolve the liquid bottoms while still hot in resinic acid, or to add the hot liquid directly to mineral acid with vigorous agitation followed by diazotization. If process design permits, the direct utilization of the bottoms in this manner allows elimination of the grinding step otherwise necessary to process solidified bottoms.

When diazotization and coupling are performed, traditional coupling agents may be used with success, such as acetoacetanilide, phenols, napthols and heterocyclic analogues of phenols and naphthols such as pyridone. Such coupling agents are well known to those skilled in the art. Examples may be found in *Dyes and Their Intermediates*, 2d Ed., E. N. Abrahart, published by Pergamon Press, 1977, pp 81–87, and *Synthetic Dyes*, vol. I, Chapter XI, K. Venkataraman, published by Academic Press, 1977. This chapter also contains a discussion of the coupling reaction at pages 411–436. The bottoms, either in their hot, liquid state, or as finely ground solidified residue, are slurried in mineral acid prior to diazotization. The term slurried, as used here, and in the claims, refers to the initial state of the reactants. In most cases, the initial slurry is transformed into a fully or partially dissolved condition. Complete dissolution effectuates the diazotization process. Generally, the diazotization is accomplished by adding from 0.5 to 0.9 equivalents of sodium nitrite based on total nitrogen, preferably from 0.7 to 0.8 equivalents. The resulting azo dyestuffs have greatly enhanced tinctorial strength as compared to colorants derived from the uncoupled deposits.

Following the diazotization and coupling reactions, the dyestuff product is separated by filtration, and the filter cake washed and dried. The colorants thus formed may be reacted with resinic acids such as oleic acid if desired.

The examples which follow serve to illustrate the process of the subject invention.

EXAMPLE 1

Forty parts by weight of finely ground glassy residue formed by cooling the bottoms recovered from the separation of aniline by distillation from pararosaniline manufacture are slowly stirred into 60 parts of oleic acid maintained at 80° C. After complete solution is obtained, the mixture is cooled to give a brownish-orange liquid which, when combined with a magenta and a blue base, yields a black blend with approximately half the strength of nigrosine oleate. The blend is suitable for coloring ribbon and ball point pen inks.

EXAMPLE 2

The powdered glassy residue as used in Example 1 is diazotized by slurrying in cold (1°–4° C.), aqueous hydrochloric acid and adding sodium nitrite equivalent to 75 percent of the total nitrogen in the residue (48 parts by weight sodium nitrite per 100 parts residue). 3.1 moles HCl per equivalent of nitrite was used, plus an additional 0.4 mole HCl to neutralize any non-diazotizable nitrogen in the powder. The diazotized residue is then coupled with betanaphthol in 5 percent molar excess. Following filtration, washing, and drying, a reddish-brown powder suitable for coloring ribbon and ball point pen inks is obtained.

EXAMPLES 3–5

The process of Example 2 is followed except that the diazotized residue is coupled with acetoacet-p-toluidine, 2,6-dihydroxy-3-cyano-4-methylpyridine, and acetoacetsulfanilamide, respectively.

In Table I, the wavelengths of maximum absorption and the corresponding extinction coefficients are given.

TABLE I

| Example No. | λ max. (nm) | E max. (lg$^{-1}$ cm$^{-1}$) |
| --- | --- | --- |
| 1 | 430 | 13.5 |
| 2 | 492 | 57.0 |
| 3 | 390 | 69.5 |
| 4 | 449 | 111.0 |
| 5 | 389 | 69.0 |

The embodiments of the invention in which an exclusive property or privilege is claimed are defined as follows:

1. A process for the manufacture of a colorant, comprising:
   (a) synthesizing a pararosaniline family dyestuff in the presence of excess low boiling amine to form a dyestuff-containing crude product;
   (b) separating substantially all of said dyestuff from said crude product by precipitation as the dyestuff salt followed by filtration;
   (c) vacuum distilling the filtrate obtained from step (b) to remove substantially all excess low boiling aromatic amine;
   (d) removing the bottoms formed during said distillation; and
   (e) dissolving said bottoms into sufficient resinic acid to substantially dissolve said bottoms.

2. The process of claim 1 wherein said pararosaniline family dyestuff is pararosaniline.

3. The process of claim 1 wherein said resinic acid is oleic acid.

4. The process of claim 2 wherein said resinic acid is oleic acid.

5. The process of claim 2, wherein said bottoms is isolated as a glassy residue and said residue is ground into powder preparatory to dissolving in said resinic acid.

6. The process of claim 1, wherein said bottoms is isolated as a glassy residue and said residue is ground into powder preparatory to dissolving in said resinic acid.

7. The colorant produced by the process of claim 1.
8. The colorant produced by the process of claim 2.
9. The colorant produced by the process of claim 3.
10. The colorant produced by the process of claim 4.

* * * * *